Sept. 16, 1924.

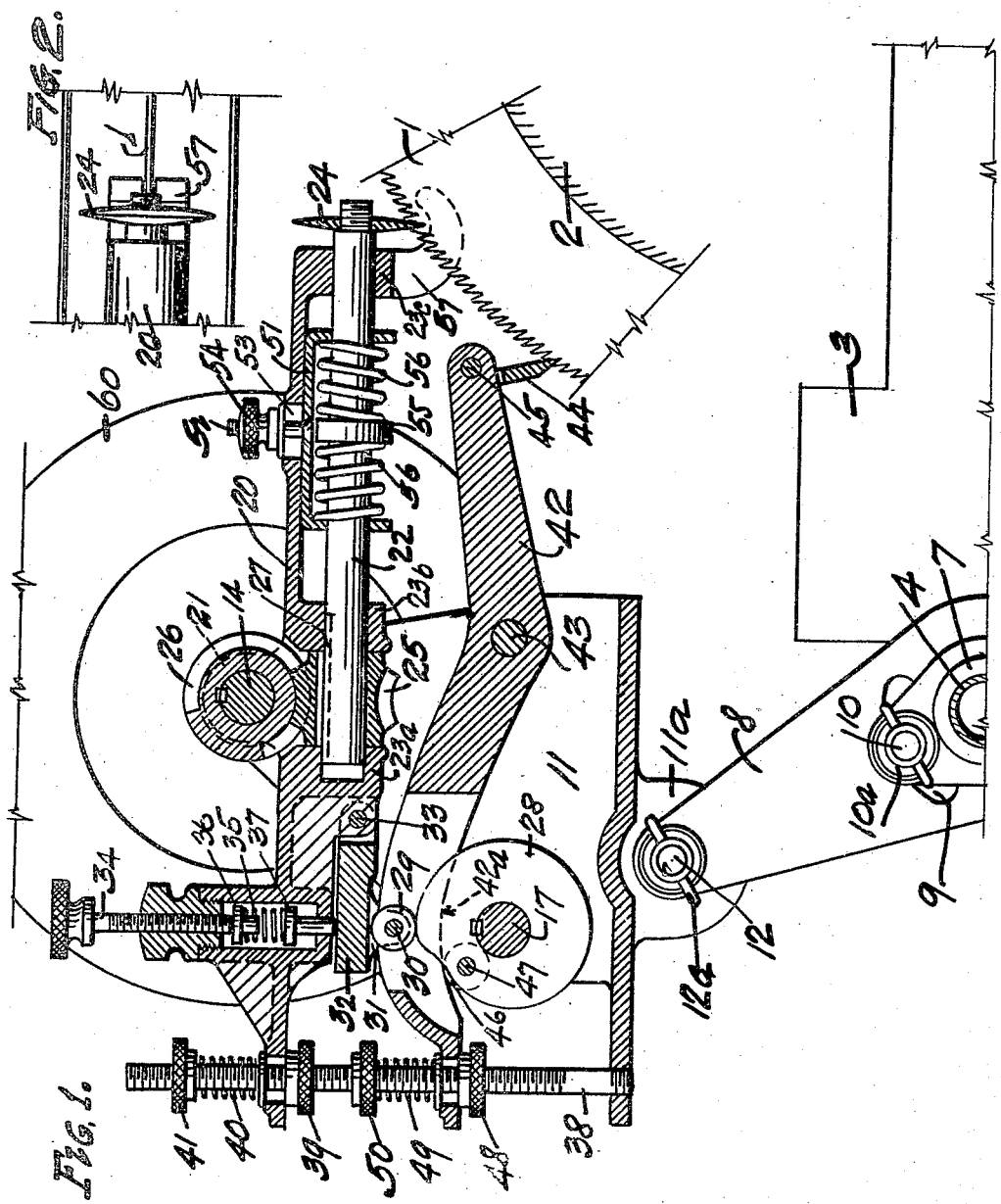

T. C. BLACK

SAW GUMMER AND SHARPENER

Filed May 2, 1923

INVENTOR.
Thomas C. Black
BY
ATTORNEY

Patented Sept. 16, 1924.

1,508,588

UNITED STATES PATENT OFFICE.

THOMAS C. BLACK, OF MEMPHIS, TENNESSEE.

SAW GUMMER AND SHARPENER.

Application filed May 2, 1923. Serial No. 636,048.

*To all whom it may concern:*

Be it known that I, THOMAS C. BLACK, a citizen of the United States, residing at Memphis, in the county of Shelby and State of Tennessee, have invented certain new and useful Improvements in Saw Gummers and Sharpeners, of which the following is a full, clear, and exact description, such as will enable anyone skilled in the art to make and use the same.

My invention relates to machines for filing circular saws and more especially to machines for filing saws for cotton gins which are thin circular saws of sheet steel, having each a large number of pointed teeth cut around the circumference thereof as in any other saw but ordinarily having no set to the teeth. Ordinarily 70 or 80 of these saws are arranged on a common mandrel, being equally spaced apart by discs about ⅜ or ⅝" thick, of about four inches smaller diameter than the saws. These saws rapidly become dull and require frequent re-sharpening, which because of the number of teeth and number of saws becomes a job of more than usual magnitude.

My invention relates especially to machines for filing these saws thus assembled either in place in the gin or after the mandrel has been removed and placed on a special frame built for that purpose. It will be noted however, that while this is its primary purpose, it may be adapted for use for filing ordinary circular saws if it be so desired.

The objects of my invention are, first, to provide a rapid and efficient saw filer; second to provide means for automatically feeding the teeth in succession to the disc file; third, to provide means for adjusting the device to various sizes of saws and under certain limitations to various positions of the saw mandrel with respect to the holding means for the filing device; fourth, to provide automatic means to permit the disc file to adjust itself to teeth slightly out of proper location; fifth, to provide means to adjust the saw location for varying pitch of teeth; sixth, to provide adjusting means for regulating depth of cut; seventh, to provide means for relieving the pressure on the filing means for irregular depth of teeth; eighth, to provide means for holding the saws steady during filing, and ninth, to improve the structure and method of operation of such machines.

I accomplish these objects as will be more fully hereinafter set out in the drawings, specifications and claims to which reference is now made.

In the drawings:

Fig. 1, is a sectional elevation on the center line of the machine, showing it in position to file a saw.

Fig. 2, is a plan view of the end of the file arbor and the saw guide, showing also the relation of adjacent saws.

Figures 3, 4:
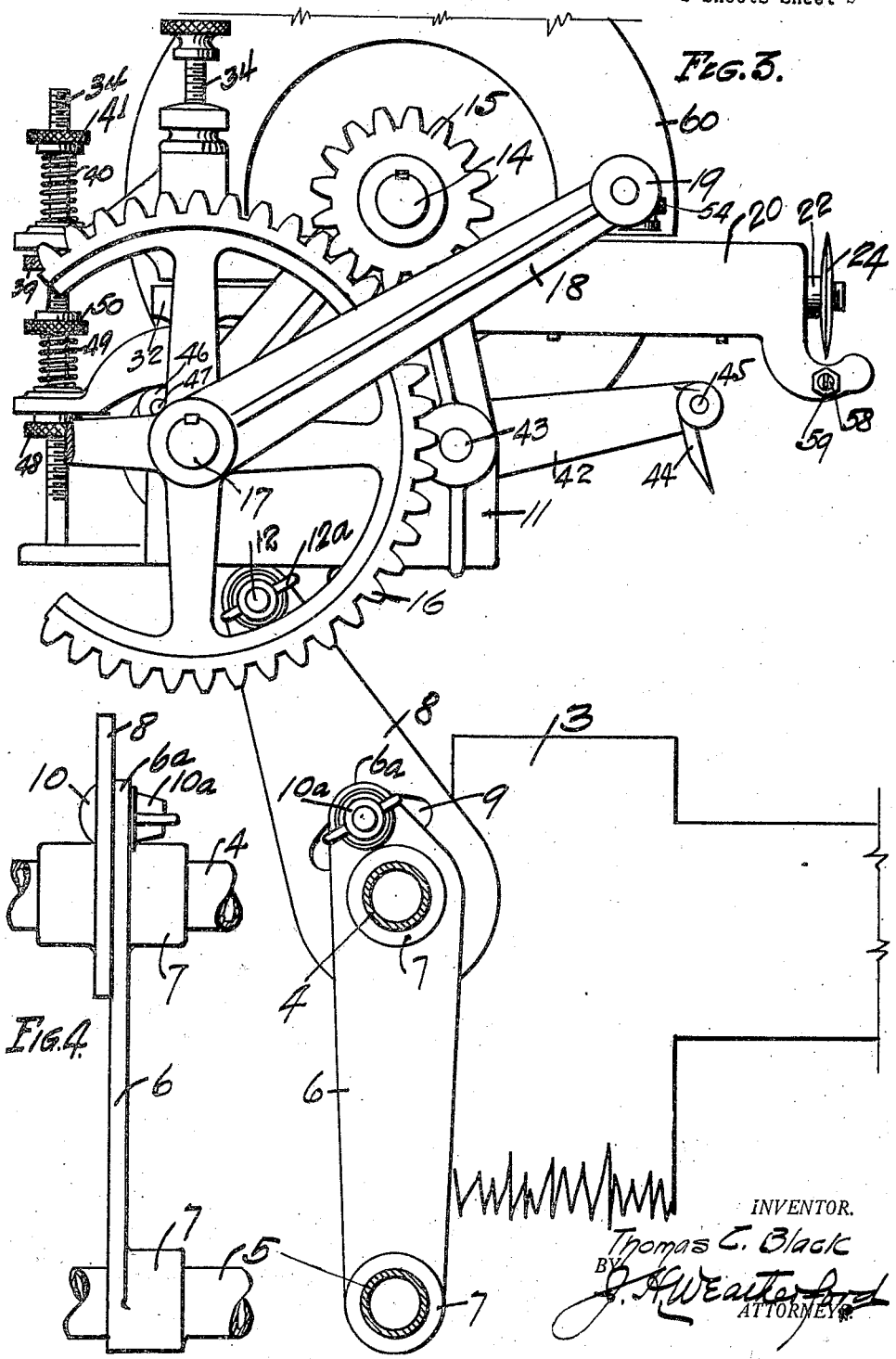
Fig. 3, is a side elevation of the machine.
Fig. 4, is a front elevation of the adjusting bracket.

Referring now to the drawings in which the various parts are indicated by the same numerals in all the views. 1, is a small portion of the circumference of the saw to be filed. 2, is a spacing disc between the saws and 3, is the frame on which the saw mandrel (not shown) is mounted and to which the filing machine is fastened. This may be the frame of the gin, or it may be a special filing frame as desired.

To this frame are bolted two rods or bars 4 and 5, which preferably for strength and stiffness are made of pipe, and which are lined up parallel with the saw mandrel. 6 is a bracket having hubs 7 which are bored out to fit slidably on the bars 4 and 5, so that the bracket may be slid along these bars to reach each saw in succession. Also mounted on the upper bar 4 is an adjustable arm 8 which is provided with a slot 9 concentric with the said bar. The upper end of this arm is adjustable toward or away from the saw 1, swinging for this purpose about the bar 4 and is clamped, when adjusted to position, by a bolt 10 which passes through a hole in the extension 6ª of the bracket 6 and through the slot 9 in the arm 8 and which is provided with a clamping nut 10ª.

Mounted on the upper end of the arm 8 is the frame 11 of the machine, this frame is fastened to the arm 8 by a bolt 12, having a nut 12ª thereon, the bolt passing through a hole in the arm 8 and in the lug 13 integral with and depending below the frame 11 and being adapted to clamp the frame in any desired position, so that the frame may be moved toward or away from the saw and leveled or adjusted as may be desired, and then clamped.

14 is a cross shaft mounted in suitable bearings in the upper post of the frame 11, on which shaft is keyed a pinion 15 which meshes with a driving gear 16 which is mounted on and keyed to a driving shaft 17, which may be rotated in any suitable manner, but preferably by a crank 18 having a handle 19 by which it may be manually operated, the shaft 17 being likewise journaled in suitable bearings in the frame 11.

20 is an arm designated herein as an arbor arm which arm has upwardly extending lugs 21 which are bored out to form bearings in which the cross shaft 14 is free to rotate the said shaft thereby forming a support on which the arm 20 may be oscillated. 22 is the disc file arbor which is journaled in bearings 23$^a$, 23$^b$ and 23$^c$ in the said arbor arm 20, and which also has a limited longitudinal motion in the said bearings. 24 is a grinding wheel or disc file which is threaded onto this arbor or otherwise fastened thereto.

25 and 26 are inter-meshing spiral gears, the gear 25 having a key 27 which slides in a spline 28 in the arbor 22 and being longitudinally confined between the bearings 23$^a$ and 23$^b$. The gear 26 is keyed or otherwise suitably fastened to the shaft 14. It will therefore, be seen that when the driving gear 16 is rotated, it will rotate the pinion 15, the shaft 14 through these spiral gears 26, 25, the arbor 22 and the filing wheel 24 thereon.

The driving shaft 17 also has keyed thereon a cam 28, the face of which cam supports a roller 29 which is journaled on a pin 30 mounted in lugs 31 projecting below an adjustable block 32, one end of which is hinged to the arbor arm 20 by a pin 33. This arm 32 may be adjusted relatively to the arbor arm 20 by means of a set screw 34 acting through a compression spring 35. 36 is a block to transmit the pressure of the said screw 34 to the spring 35 and 37 a plunger between the spring and the adjustable block 32. 38 is a threaded post screwed into the frame 11, which post carries an adjustable nut 39, to limit the return motion of the arbor arm 20 and a compression spring 40, acting against the said arm 20 to hold the roller 29 in contact with the cam 28. 41 is a nut to adjust or regulate the tension of the spring 40. 42 is a feed arm which is pivoted on a pin 43 mounted in the frame 11. 44 is a dog hinged on a pin 45 in the end of the said feed arm, which dog is adapted to engage in succession each tooth of the saw to be filed and to move the said saw forward one tooth at a time. The arm 42 is slotted to provide space for the cam 28, and the roller 29 and its supporting lugs 31. The underside 42$^a$ of this arm rests on and is oscillated by rollers 46 which in turn are journaled on a pin 47 which passes through and is fastened in the cam 28. 48 is a nut on the post 28 limiting the return motion of the said arm 42. 49 is a compression spring to provide such return motion, and 50 is a nut to regulate the tension of the spring.

The arbor 22 as before stated, has a limited longitudinal motion. 51 is a yoke carried by a bolt 52 which extends through a slot 53 in the arbor arm 20. 54 is a nut which may be loosened to move this yoke and adjust the arbor longitudinally. The arbor 22 also carries a collar 55 fixed thereon and 56 are oppositely disposed compression springs which bear against this collar and the yoke 51 to provide a limited automatic longitudinal adjustment of the said arbor. 57 is the saw guide which it will be especially noted is a part of the bearing 23$^c$ at the outer end of the arbor arm 20 and is not only in close proximity to the point of action of the disc file 24, but also is in fixed relation to the axis of the said disc file and within very narrow limits to the sphere of cutting action thereof, so that it conforms in movement to the axis and to the disc file. This guide is formed by cutting a slot of slightly greater width than the thickness of the saw in a downwardly and outwardly projecting lug integral with the end of the arbor arm 20 and which lug preferably surrounds the entire sphere of cutting action of the said disc file when the same is being used. This it will be noted brings a part of the guide or holder as close as allowable to the edge of the disc and directly in the plane of action of the said disc. If desired, the guide 57 may be provided on either or both sides with a set screw 58 which may be locked by a nut 59 (Figs. 2 and 3), only one such screw being shown. 60 is a fly wheel mounted on the shaft 14.

In use, the bars 4 and 5 with the machine thereon are bolted to the frame 3, carrying the saws to be filed. The bracket 6 is shifted to bring the machine in line with the first saw and the arm 8 and frame 11 are then adjusted to bring the disc file 24 into approximately proper relation with one of the teeth and the feed dog 44 into relation with another tooth, and the parts are clamped.

Final adjustment is then made by shifting the saw arbor 22 slightly by means of the yoke 51 and the depth of cut is adjusted by tightening or loosening the screw 34. Filing is then started by turning the handle 19 and thus rotating the filing wheel. As the driving gear is rotated the cam 28 is also rotated forcing the roller 29 upward and the filing wheel 24 downward against the tooth. As the high point of the cam passes the roller 29 and the latter starts downward, the rollers 46 begin acting against the underside 42$^a$ of the arm 42 thus forcing the dog 44 downward and advancing the saw one tooth and into position for the next tooth to be filed. Should an individual tooth be slightly out of place, the springs 56 permit the disc file 24 to adjust itself automatically to the incorrect spacing at the same time causing the file to bear hardest against the incorrect side and thereby cut where most needed. Should the saw be out of round and too large at any point, the spring 35 would provide relief against possible damage to saw or disc file, and at the same time exert extra pressure to file the tooth deeper as it should be.

Should the saw be small, the nut 39 would prevent the disc file from making any cut. It will thus be possible by filing around a saw, two or possibly more times and adjusting the nut 39 to the lowest tooth to file a saw perfectly round. The guide 57 moving with the disc file 24 is at all times in position to effectively steady the saw at the point where it is needed.

I have used in this specification the term "disc file", but it is distinctly to be understood that this may be a file, or a grinding wheel, as may be desired. I have used the term "keyed" as designating a means for fastening the cam, gears and pinions to shafts, but I wish it distinctly understood that I do not thereby limit myself to such form of fastening only, as it is evident that set screws or other forms of fastening may be used without departing from the spirit of my invention.

Having now fully described my invention, what I claim and desire to secure by Letters Patent in the United States is:—

1. On a saw gummer and sharpener the combination with a longitudinal shaft, means for rotating the same, a disc file carried thereon and means for bringing the same into cutting relation to a tooth to be filed, a yoke surrounding said shaft, a collar on said shaft intermediate the arms of said yoke, resilient means interposed between the collar and each yoke arm, to permit the shaft to automatically adjust itself in both directions axially, to adjust the file to variations in tooth location.

2. In a saw gumming machine, the combination with parallel transverse members, a bracket slidable thereon, an arm rotatably adjustable about one of said members, means for clamping said arm to said bracket, a frame hinged to the upper end of said arm, means for locking the position of said frame on said arm, a transverse shaft journaled in said frame, an arbor arm oscillably mounted thereon, an arbor longitudinally movable, journaled in bearings on the said arm, a collar on said arbor, a disc file mounted on the outer end of the said arbor, a yoke longitudinally adjustable relatively to said arbor arm having a depending member embracing said arbor on each side of said collar compression springs surrounding said arbor between said collar and said yoke members, a pair of spiral gears driving said arbor from said cross shaft, a pinion on said cross shaft, a driving shaft and means for rotating the same, a driving gear meshing with said pinion attached to and rotated by said driving shaft, a cam on said driving shaft, an adjustable block hinged below the inner end of said arbor arm, a roller journaled in said block and resting on said cam, an adjusting screw, a compression spring between said screw and said block, a compression spring bearing against the upper side of the inner end of said arbor arm, and means for adjusting the tension of the said spring, a feed arm oscillatably mounted in the machine frame, a roller journaled in said cam bearing against the inner end of said feed arm, a compression spring to hold said arm against said roller, means for adjusting the tension of said spring, and a dog on the outer end of said arm adapted to engage the teeth of a saw to be filed.

3. In a saw gummer, the combination with a frame, and means for adjusting same relatively to the saw, a transverse shaft journaled in said frame, an arbor arm oscillably mounted thereon, an arbor longitudinally movable, journaled in bearings on the said arm, a collar on said arbor, a disc file mounted on the outer end of the said arbor, a yoke longitudinally adjustable relatively to said arbor arm having a depending member embracing said arbor on each side of said collar, compression springs surrounding said arbor between said collar and said yoke members, means for driving said arbor from said shaft, a cam and means for rotating the same, an adjustable block hinged below the inner end of said arbor arm, a roller journaled in said block and resting on said cam, an adjusting screw, a compression spring between said screw and said block, a compression spring bearing against the upper side of the inner end of said arbor arm, and means for adjusting the tension of the said spring, a feed arm oscillatably mounted in the machine frame, a roller journaled in said cam bearing against the inner end of said feed arm, a compression spring to hold said arm against said roller, means for adjusting the tension of said spring, and a dog on the outer end of said arm adapted to engage the teeth of a saw to be filed.

4. In a saw gummer, the combination with a frame and means for adjusting and locking the position of the same, of an arbor arm oscillably mounted therein, an arbor longitudinally movable, journaled in bearings on the said arm, a disc file mounted on the outer end of the said arbor, a yoke longitudinally adjustable relatively to said arbor arm having a depending member embracing said arbor on each side of said collar, compression springs surrounding said arbor between said collar and said yoke members, driving means for said arbor, a cam, resilient adjusting means between said cam and the inner end of said arbor arm, a compression spring bearing against the upper side of the inner end of said arbor arm, and means for adjusting the tension of the said spring, a feed arm oscillatably mounted in the machine frame, a roller journaled in said cam, bearing against the inner end of said arm, a compression spring to hold said arm against said roller, means for adjusting the tension of said spring, a dog on the outer end of said arm adapted to engage the teeth of a saw to be filed.

5. In a saw gummer, the combination with a frame and means for adjusting same relatively to the saw, of an arbor arm oscillably mounted therein, an arbor longitudinally movable, journaled in bearings on the said arm, a disc file mounted on the outer end of the said arbor, resilient means permitting longitudinal displacement of said arbor, means for driving said arbor, a cam, and means for rotating the same, a resilient member between said cam and the inner end of said arbor arm, adjusting means for said member, resilient means for holding said end of said arbor arm toward said cam, a feed arm oscillatably mounted in the said frame, a roller journaled in said cam, bearing against the inner end of said feed arm, means holding said arm against said roller, means for adjusting the tension of said means, and a dog on the outer end of said arm adapted to engage the teeth of a saw to be filed.

6. In a saw gummer, the combination with a frame and means for adjusting and locking the position of said frame, of an arbor arm oscillably mounted therein, an arbor journaled in bearings on the outer end of said arm, a disc file mounted on the outer end of the said arbor, driving means for said arbor, a cam below the inner end of said arbor arm, resilient adjusting means between said cam and the inner end of said arbor arm, resilient means for holding the inner end of the said arm down, a feed arm oscillatably mounted in the said frame, means carried by said cam for operating said feed arm, a spring to hold said arm against said operating means, means for adjusting the tension of said spring, and a dog on the outer end of said arm adapted to engage the teeth of a saw to be filed.

7. In a saw gummer, the combination of parallel transverse bars, a bracket slidable thereon, an arm rotatably adjustable about one of said bars, means for clamping said arm to said bracket, a frame hinged to the upper end of said arm, means for locking the position of said frame on said arm, and saw gumming means carried by said frame.

8. In a saw gumming machine, the combination with a transverse shaft, an arbor arm oscillably mounted thereon, an arbor journaled in bearings on the said arm, a filing wheel mounted on the outer end of the said arbor, a pair of spiral gears driving said arbor from said cross shaft, a pinion on said cross shaft, a driving shaft and means for rotating the same, a driving gear shaft, a cam on said driving shaft, an adjustable block hinged below the inner end of said arbor arm, a roller journaled in said block and resting on said cam, a compression spring against said block, means for varying the tension of said spring, a compression spring bearing against the upper side of the inner end of said arbor arm, and means for adjusting the tension of the said spring, and feed means operated from said cam.

9. In a saw gummer, the combination with a transverse shaft, an arbor arm oscillatably mounted thereon, an arbor longitudinally movable, journaled in bearings on the said arm, a disc file mounted on the outer end of the said arbor, means for driving said shaft, a cam and means for rotating the same, an adjustable member between the inner end of said arbor arm and said cam, resilient means of holding the inner end of said arbor arm, against said member and means for adjusting the same, and feeding means controlled from said cam.

In testimony whereof I have hereunto set my name.

THOMAS C. BLACK.

Witnesses:
 CHAS. R. RUBEY,
 F. C. PEARSON.